United States Patent
Venkatramani et al.

(10) Patent No.: US 12,499,300 B1
(45) Date of Patent: Dec. 16, 2025

(54) SYSTEMS AND METHODS FOR GENERATING A FLOORPLAN AND BUMP PLACEMENT FOR A PACKAGE DESIGN

(71) Applicants: Advanced Micro Devices, Inc., Santa Clara, CA (US); ATI Technologies ULC, Markham (CA)

(72) Inventors: Rajagopalan Venkatramani, Hsinchu (TW); Liane Martinez, Markham (CA); Gabriel Wong, Markham (CA); Renato Dimatula Gaddi, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 592 days.

(21) Appl. No.: 17/978,071

(22) Filed: Oct. 31, 2022

(51) Int. Cl.
*G06F 30/392* (2020.01)

(52) U.S. Cl.
CPC ................ *G06F 30/392* (2020.01)

(58) Field of Classification Search
CPC .................................................. G06F 30/392
USPC .............................................................. 716/119
See application file for complete search history.

(56) References Cited

U.S. PATENT DOCUMENTS

| | | | | |
|---|---|---|---|---|
| 5,838,583 A * | 11/1998 | Varadarajan | .......... | G06F 30/392 716/135 |
| 6,067,409 A * | 5/2000 | Scepanovic | .......... | G06F 30/392 716/122 |
| 6,249,902 B1 * | 6/2001 | Igusa | .......... | G06F 30/392 716/135 |
| 7,472,363 B1 * | 12/2008 | Chandra | .......... | G06F 30/23 716/138 |
| 8,225,262 B1 * | 7/2012 | Tom | .......... | G06F 30/34 716/122 |
| 8,375,345 B1 * | 2/2013 | Barowski | .......... | G06F 30/30 716/132 |
| 8,375,348 B1 * | 2/2013 | Raj | .......... | G06F 30/23 716/132 |

(Continued)

FOREIGN PATENT DOCUMENTS

| | | | | |
|---|---|---|---|---|
| WO | WO-9952049 A2 * | 10/1999 | .......... | G06F 30/392 |
| WO | WO-2007002799 A1 * | 1/2007 | .......... | G06F 30/392 |

(Continued)

*Primary Examiner* — Suresh Memula
(74) *Attorney, Agent, or Firm* — Greenberg Traurig, LLP

(57) ABSTRACT

The disclosed computer-implemented method can include defining, by at least one processor, one or more boundary conditions. The method can additionally include importing, by the at least one processor, one or more tiles outlines that at least define importing, by the at least one processor, one or more tiles outlines that at least define a cell hierarchy for one or more chiplets. The method can also include defining, by the at least one processor and based at least in part on the one or more tiles outlines, one or more cells of the one or more chiplets at least in part by automatically filling one or more slave cells of the one or more chiplet with a same bump pattern as a master cell of the one or more chiplets. The method can further include generating, by the at least one processor and based at least in part on the defined boundary conditions and the defined one or more cells, a floorplan and bump placement for a package design. Various other methods, systems, and computer-readable media are also disclosed.

20 Claims, 8 Drawing Sheets

(56) References Cited

U.S. PATENT DOCUMENTS

| | | | | |
|---|---|---|---|---|
| 8,549,457 B1* | 10/2013 | Moore | ................ | G06F 30/392 |
| | | | | 716/119 |
| 8,739,103 B1* | 5/2014 | Dutta | ................... | G06F 30/347 |
| | | | | 716/132 |
| 9,280,621 B1* | 3/2016 | Ginetti | .................... | G06F 30/33 |
| 10,348,563 B2* | 7/2019 | Rao | .................... | H04L 41/0826 |
| 10,885,249 B1* | 1/2021 | Kollesar | ............... | G06F 30/392 |
| 2004/0230931 A1* | 11/2004 | Barbee, III | .......... | G06F 30/392 |
| | | | | 716/122 |
| 2004/0268288 A1* | 12/2004 | Bajuk | .................... | G06F 30/30 |
| | | | | 716/103 |
| 2005/0028122 A1* | 2/2005 | Fallon | .................. | G06F 30/392 |
| | | | | 716/122 |
| 2008/0216038 A1* | 9/2008 | Bose | .................... | G06F 30/392 |
| | | | | 716/118 |
| 2009/0024347 A1* | 1/2009 | Chandra | ............... | G06F 30/367 |
| | | | | 702/130 |
| 2011/0289468 A1* | 11/2011 | Keinert | ................. | G06F 30/392 |
| | | | | 716/124 |
| 2013/0055176 A1* | 2/2013 | Cho | ...................... | G06F 30/392 |
| | | | | 716/104 |
| 2014/0359546 A1* | 12/2014 | Chan | .................... | G06F 30/398 |
| | | | | 716/119 |
| 2017/0212975 A1* | 7/2017 | Moore | ................ | G06F 30/394 |
| 2021/0064716 A1* | 3/2021 | Wolpert | ............... | G06F 30/392 |
| 2022/0058328 A1* | 2/2022 | Castle | .................... | G06F 30/27 |
| 2023/0050432 A1* | 2/2023 | Wolpert | ............... | G06F 30/392 |

FOREIGN PATENT DOCUMENTS

| | | | | | |
|---|---|---|---|---|---|
| WO | WO-2007070879 A1 | * | 6/2007 | ............. | G06F 30/20 |
| WO | WO-2023015536 A1 | * | 2/2023 | ........... | G06F 30/392 |

* cited by examiner

700

SYSTEMS AND METHODS FOR GENERATING A FLOORPLAN AND BUMP PLACEMENT FOR A PACKAGE DESIGN

BACKGROUND

Integrated circuit (IC) design, is a sub-field of electronics engineering, encompassing the particular logic and circuit design techniques required to design ICs. ICs consist of miniaturized electronic components built into an electrical network on a monolithic semiconductor substrate by photolithography. Many IC designs are based on chiplets, which are tiny ICs that contain a well-defined subset of functionality. Chiplets are designed to be combined with other chiplets on an interposer in a single package.

Electronic design automation (EDA), also referred to as electronic computer-aided design (ECAD), is a category of software tools for designing electronic systems such as printed circuit boards (PCBs). The tools work together in a design flow that chip designers use to design and analyze entire semiconductor chips. Since a modern semiconductor chip can have billions of components, EDA tools are essential for their design.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
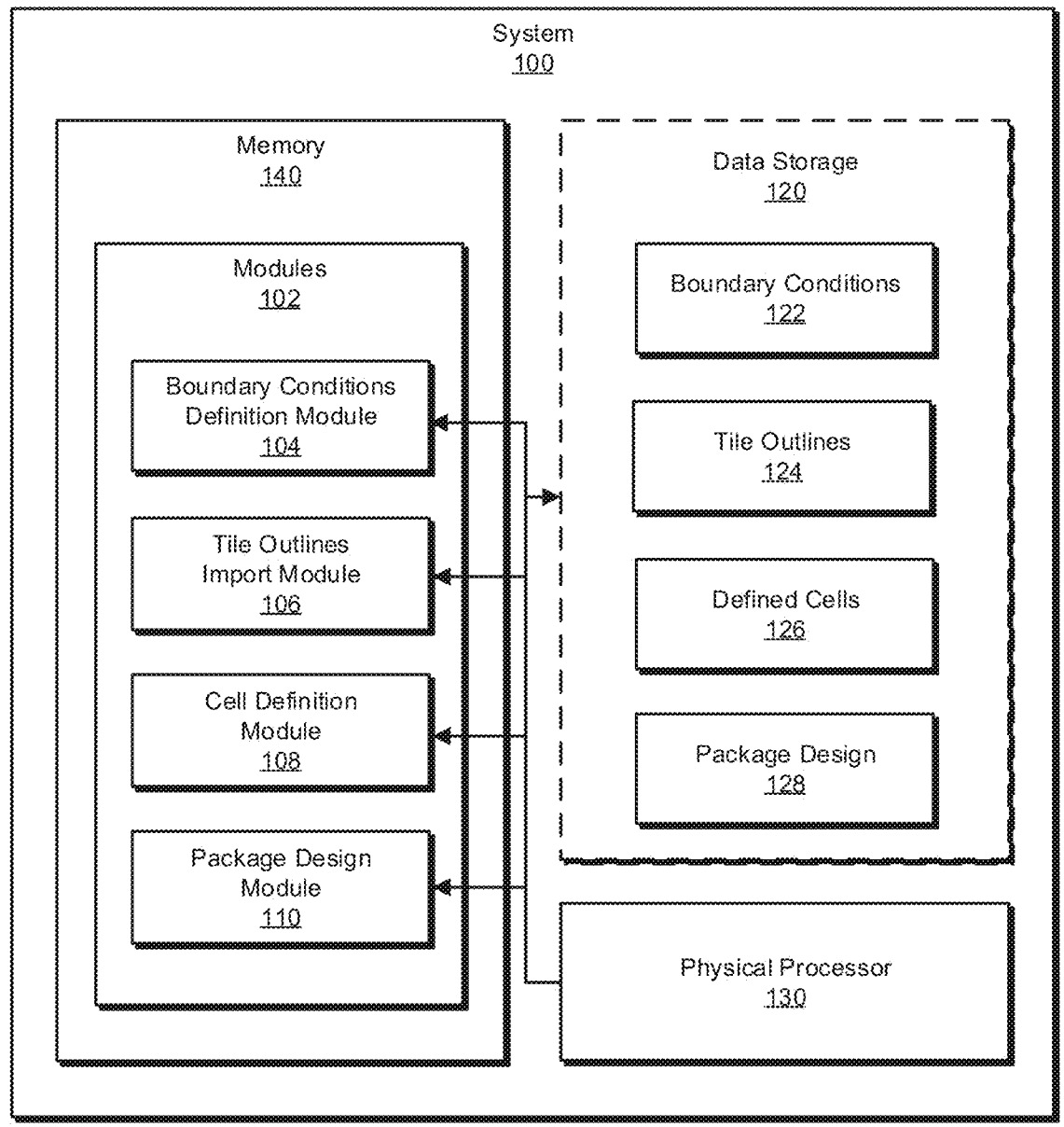
FIG. 1 is a block diagram of an example system for generating a floorplan and bump placement for a package design.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for generating a floorplan and bump placement for a package design. A tile layout can include many cells repeating one or more integrated circuit (IC) designs, with one of the cells corresponding to a master cell (e.g., moderator, requestor, etc.) and the remaining cells corresponding to slave cells (e.g., station, home agent, etc.). Even with the assistance of EDA tools, the process of designing a floorplan specifying the bumps of the package die is performed traditionally with manual placement of features, requiring many hours (e.g., more than 100 hours) of labor by senior engineers.

The systems and methods disclosed herein integrate three-dimensional Integrated circuit (3DIC) design with chiplet and package design through floorplan and bump modeling. These systems and methods automate floorplan creation and design feasibility studies in a manner that can significantly reduce efforts of senior engineers. Example systems and methods achieve this functionality by defining boundary conditions, importing one or more tiles outlines that define a cell hierarchy for one or more chiplets, defining cells of the one or more chiplets by automatically filling one or more slave cells with a same bump pattern as a master cell of the one or more chiplets, and generating a floorplan and bump placement for a package design based on the boundary conditions and the defined cells.

In one example, a computer-implemented method can include defining, by at least one processor, one or more boundary conditions, importing, by the at least one processor, one or more tiles outlines that at least define a cell hierarchy for one or more chiplets, defining, by the at least one processor and based at least in part on the one or more tiles outlines, one or more cells of a chiplet at least in part by automatically filling one or more slave cells of the chiplet with a same bump pattern as a master cell of the chiplet, and generating, by the at least one processor and based at least in part on the defined boundary conditions and the defined one or more cells, a floorplan and bump placement for a package design.

Another example can be the previously described method, wherein the one or more boundary conditions include at least one of a die boundary, a package boundary, one or more keep-out zones for the one or more chiplets, or one or more boundary offsets for the one or more chiplets.

Another example can be the method of any of the previously described example methods, wherein defining the one or more cells is further based on a hierarchy provided by the imported one or more tiles outlines.

Another example can be the method of any of the previously described example methods, further including defining, by the at least one processor in response to one or more user inputs, at least one of a position or orientation of the one or more chiplets.

Another example can be the method of any of the previously described example methods, wherein the one or more user inputs correspond to one or more selections to perform at least one of flipping the one or more chiplets, rotating the one or more chiplets, or specifying an origin of the one or more chiplets.

Another example can be the method of any of the previously described example methods, further including importing one or more files at least defining one or more fixed components for physical implementation and attaching a bump pattern to a master cell of a fixed component, wherein generating a floorplan and bump placement of the package design is further based on the one or more fixed components.

Another example can be the method of any of the previously described example methods, further including modifying, by the at least one processor in response to one or more user inputs, one or more bump patterns of one or more of the defined one or more cells.

Another example can be the method of any of the previously described example methods, wherein the one or more user inputs correspond to one or more selections to perform at least one of making an individual slave cell an independent cell, flipping the independent cell rotating the independent cell, changing individual bumps of a bump pattern of the independent cell, or defining the independent cell as no fill.

Another example can be the method of any of the previously described example methods, further including forming, by the at least one processor and in response to one or more user inputs, at least one of one or more groups of tiles, one or more structures containing at least one of one or more predefined fixed components for physical implementation, one or more groups of tiles, one or more individual tiles, or one or more macros containing at least one of one or more structures, one or more predefined fixed components for physical implementation, one or more groups of tiles, or one or more individual tiles, and performing at least one of repeating or modifying, by the at least one processor and in response to one or more user inputs, the one or more groups of tiles, the one or more structures, or the one or more macros.

Another example can be the method of any of the previously described example methods, wherein the one or more user inputs correspond to one or more selections to perform at least one of making an individual group of tiles an independent group of tiles, defining a number of repetitions of the one or more groups of tiles, the one or more structures, or the one or more macros, defining a position of a repeated one or more groups of tiles, the one or more structures, or the one or more macros, or at least one of flipping or rotating at least one of an individual group of tiles, an individual structure, or an individual macro.

Another example can be the method of any of the previously described example methods, further including providing a predefined bump pattern, by the at least one processor and based on the boundary conditions, in gaps of the floorplan that lie between at least one of individual cells, individual tiles, groups of tiles, structures, macros, or floorplan boundaries.

Another example can be the method of any of the previously described example methods, wherein providing the predefined bump pattern is further based on one or more user inputs corresponding to one or more selections to perform at least one of aligning the predefined bump pattern within at least one of the gaps and/or changing individual bumps of the predefined bump pattern.

In one example, a system can include at least one physical processor and physical memory including computer-executable instructions that, when executed by the physical processor, cause the physical processor to define one or more boundary conditions, import one or more tiles outlines that at least define a cell hierarchy for one or more chiplets, define, based at least in part on the one or more tiles outlines, one or more cells of the one or more chiplets at least in part by automatically filling one or more slave cells of the one or more chiplets with a same bump pattern as a master cell of the one or more chiplets, and generate, based at least in part on the defined boundary conditions and the defined one or more cells, a floorplan and bump placement for a package design.

Another example can be the system of the previously described example system, the one or more boundary conditions include at least one of a die boundary, a package boundary, one or more keep-out zones for the one or more chiplets, or one or more boundary offsets for the one or more chiplets.

Another example can be the system of any of the previously described example systems, wherein the instructions cause the at least one processor to define the one or more cells further based on a hierarchy provided by the imported one or more tiles outlines.

Another example can be the system of any of the previously described example systems, wherein the instructions further cause the at least one processor to define, in response to one or more user inputs, at least one of a position or orientation of the one or more chiplets.

Another example can be the system of any of the previously described example systems, wherein the instructions further cause the at least one processor to import one or more predefined files at least defining one or more fixed components for physical implementation and attach a bump pattern to a master cell of a fixed component, wherein generating the floorplan and bump placement for a package design is further based on the one or more predefined files.

Another example can be the system of any of the previously described example systems, wherein the instructions further cause the at least one processor to modify, in response to one or more user inputs, one or more bump patterns of one or more of the defined one or more cells.

Another example can be the system of any of the previously described example systems, wherein the instructions further cause the at least one processor to provide a predefined bump pattern, based on the boundary conditions, in gaps of the floorplan that lie between at least one of individual cells, individual tiles, groups of tiles, structures, macros, or floorplan boundaries.

In one example, a non-transitory computer-readable medium can include one or more computer-executable instructions that, when executed by at least one processor of a computing device, cause the computing device to define one or more boundary conditions, import one or more tiles outlines that at least define a cell hierarchy for one or more chiplets, define, based at least in part on the one or more tiles outlines, one or more cells of the one or more chiplets at least in part by automatically filling one or more slave cells of the one or more chiplets with a same bump pattern as a master cell of the one or more chiplets, and generate, based at least in part on the defined boundary conditions and the defined cells, a floorplan and bump placement for a package design.

Figure 2:
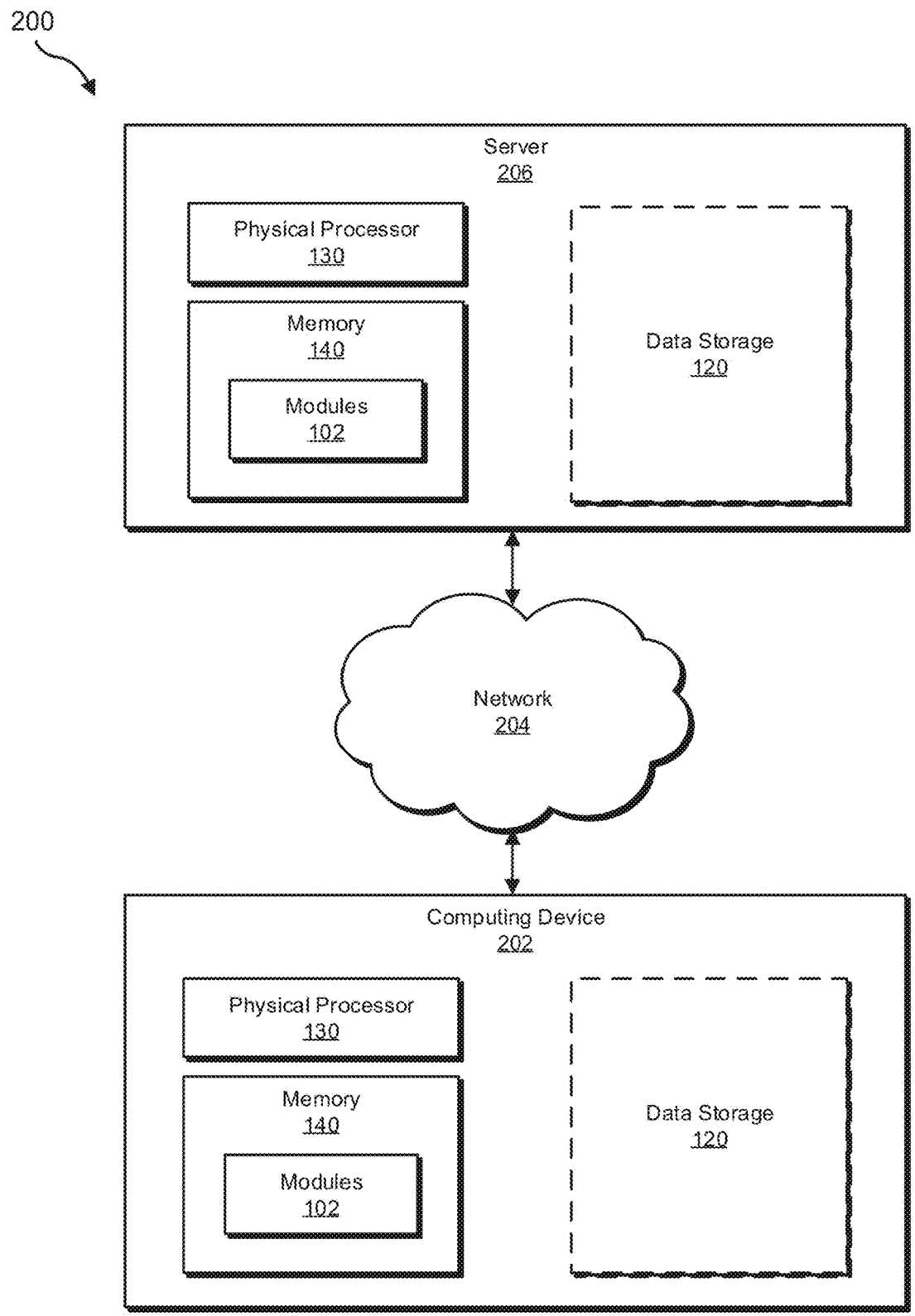
FIG. 2 is a block diagram of an additional example system for generating a floorplan and bump placement for a package design.

The following will provide, with reference to FIGS. 1-2, detailed descriptions of example systems for generating a floorplan and bump placement for a package design. Detailed descriptions of corresponding computer-implemented methods will also be provided in connection with FIG. 3. In addition, detailed descriptions of floorplans and floorplan boundaries will be provided in connection with FIGS. 4-6. Also, detailed descriptions of bump modeling based on a hierarchy of macros, structures, and tiles will be provided in connection with FIGS. 6 and 7. Further, detailed descriptions of graphical user interface elements used for bump modeling will be provided in connection with FIG. 8.

FIG. 1 is a block diagram of an example system 100 for generating a floorplan and bump placement for a package design. As illustrated in this figure, example system 100 can include one or more modules 102 for performing one or more tasks. As will be explained in greater detail below, modules 102 can include a boundary conditions definition module 104, a tiles outlines import module 106, a cell definition module 108, and a package design generation module 110. Although illustrated as separate elements, one or more of modules 102 in FIG. 1 can represent portions of a single module or application.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices, such as the devices illustrated in FIG. 2 (e.g., computing device 202 and/or server 206). One or more of modules 102 in FIG. 1 can also represent all or portions of one or more special-purpose computers configured to perform one or more tasks.

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate generating a floorplan and bump placement for a package design. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 can also include one or more instances of stored data, such as data storage 120. Data storage 120 generally represents any type or form of stored data. In one example, data storage 120 includes databases, spreadsheets, tables, lists, matrices, trees, library exchange format (LEF) files, design exchange format (DEF) files, full chip floorplan (FCFP) files, graphic data system (GDS) files, two-dimensional (2D) and/or three-dimensional (3D) models, graphical data files (e.g., bitmaps, joint photographic expert group files (JPEGs), graphics interchange format files (GIFs), tag image file format files (TIFFs), etc.) or any other type of data structure. Examples of data storage 120 include, without limitation, boundary conditions 122, tiles outlines 124, defined cells 126, and package design 128.

Example system 100 in FIG. 1 can be implemented in a variety of ways. For example, all or a portion of example system 100 can represent portions of example system 200 in FIG. 2. As shown in FIG. 2, system 200 can include a computing device 202 in communication with a server 206 via a network 204. In one example, all or a portion of the functionality of modules 102 can be performed by computing device 202, server 206, and/or any other suitable computing system. As will be described in greater detail below, one or more of modules 102 from FIG. 1 can, when executed by at least one processor of computing device 202 and/or server 206, enable computing device 202 and/or server 206 to generate a floorplan and bump placement for a package design.

Computing device 202 generally represents any type or form of computing device capable of reading computer-executable instructions. For example, computing device is any computer capable of receiving, processing, and storing data. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of receiving, processing, and storing data. Additional examples of server 206 include, without limitation, storage servers, database servers, application servers, and/or web servers configured to run certain software applications and/or provide various storage, database, and/or web services. Although illustrated as a single entity in FIG. 2, server 206 can include and/or represent a plurality of servers that work and/or operate in conjunction with one another.

Network 204 generally represents any medium or architecture capable of facilitating communication or data transfer. In one example, network 204 can facilitate communication between computing device 202 and server 206. In this example, network 204 can facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
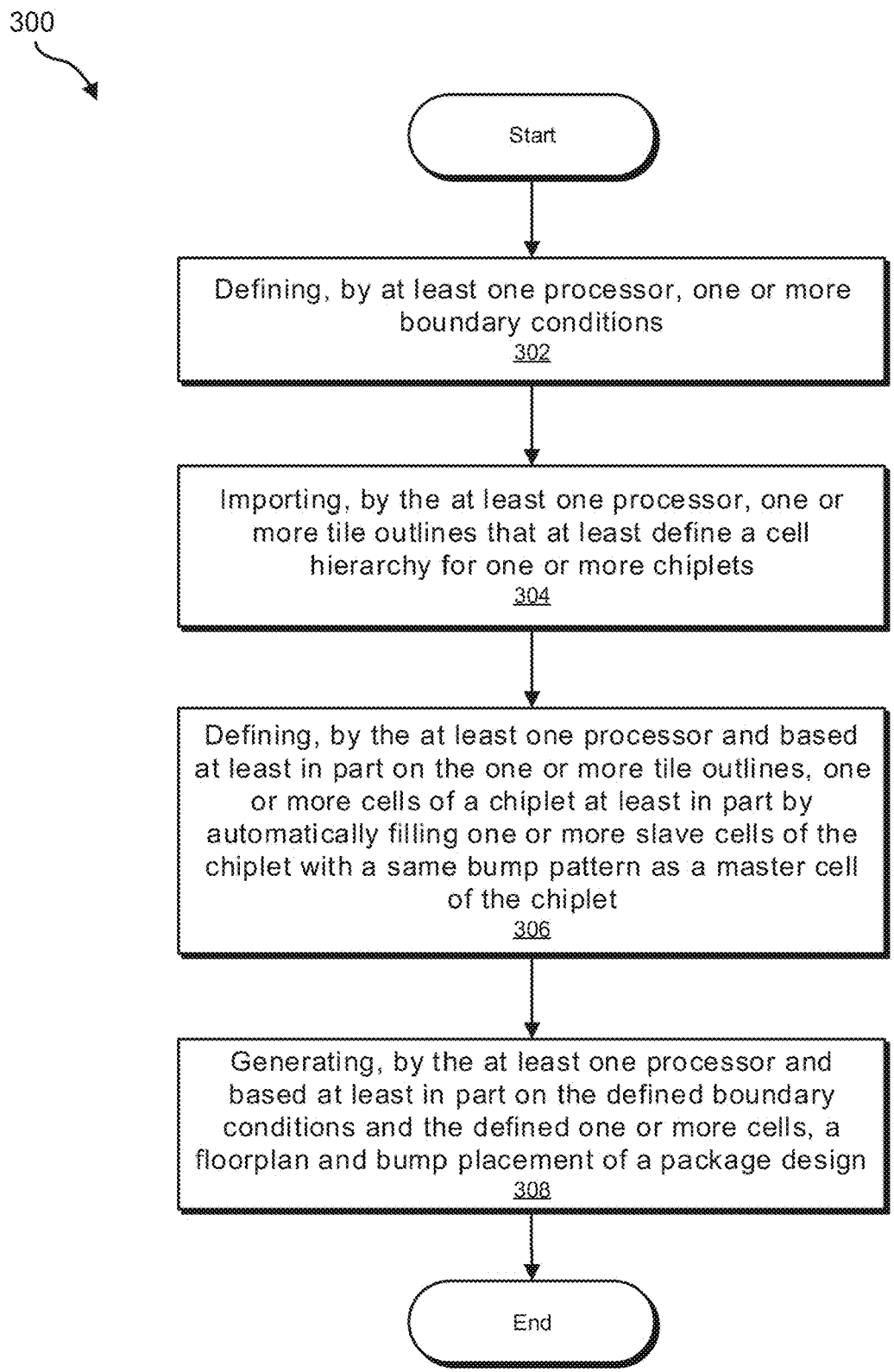
FIG. 3 is a flow diagram of an example method for generating a floorplan and bump placement for a package design.

FIG. 3 is a flow diagram of an example computer-implemented method 300 for generating a floorplan and bump placement for a package design. The steps shown in FIG. 3 can be performed by any suitable computer-executable code and/or computing system, including system 100 in FIG. 1, system 200 in FIG. 2, and/or variations or combinations of one or more of the same. In one example, each of the steps shown in FIG. 3 can represent an algorithm whose structure includes and/or is represented by multiple substeps, examples of which will be provided in greater detail below.

As illustrated in FIG. 3, at step 302 one or more of the systems described herein can define boundary conditions. For example, boundary conditions definition module 104, as part of computing device 202 in FIG. 2, can define, by at least one processor, one or more boundary conditions.

The term "boundary conditions," as used herein, can generally refer to one or more conditions that are required to be satisfied at all or part of the boundary of a region. Examples of boundary conditions include, without limitation, values for the interposer top die boundary, interposer top die bounding boxes (e.g., package boundary, fan out boundary, etc.), stitching zones, keep out zones for each chiplet, and a boundary offset for each chiplet.

The systems described herein can perform step 302 in a variety of ways. In some examples, boundary conditions definition module 104, as part of computing device 202 in FIG. 2, can define boundary conditions that include a die boundary, a package boundary, one or more stitching zones, one or more keep-out zones for the one or more chiplets, and/or one or more boundary offsets for the one or more chiplets.

At step 304 one or more of the systems described herein can import tiles outlines. For example, tiles outlines import module 106, as part of computing device 202 in FIG. 2, can import, by the at least one processor, one or more tiles outlines that at least define a cell hierarchy for one or more chiplets.

The term "tiles outlines," as used herein, can generally refer to one or more files that define one or more characteristics of a chiplet. Examples of tiles outlines include, without limitation, text files, graphics files, 2D models, bit maps, and/or 3D models that specify one or more chiplet cell characteristics, such as number of cells, master and slave cells, net names, etc.

The term "hierarchy," as used herein, can generally refer to an organizational structure in which items are ranked in a specific manner, usually according to levels of importance. Examples of hierarchy include, without limitation, definitions of master and slave cells and definitions of macros, structures, fixed components, groups of tiles, individual tiles, and independent tiles.

The systems described herein can perform step 304 in a variety of ways. In some examples, tiles outlines import module 106, as part of computing device 202 in FIG. 2, can import one or more files at least defining one or more fixed components for physical implementation.

At step 306 one or more of the systems described herein can define cells. For example, cell definition module 108, as part of computing device 202 in FIG. 2, can define, by the at least one processor and based at least in part on the one or more tiles outlines, one or more cells of the one or more chiplets at least in part by automatically filling one or more slave cells of the one or more chiplets with a same bump pattern as a master cell of the one or more chiplets.

The term "cell," as used herein, can generally refer to a smallest functional unit of a chiplet. For example, and without limitation, a cell can be an integrated circuit that, within the context of a tiles outline, forms a part of a chiplet and is not further subdivided for purposes of forming a tile layout and floorplan. Other nonlimiting examples include master cells and slave cells.

The systems described herein can perform step 306 in a variety of ways. In some examples, cell definition module 108, as part of computing device 202 in FIG. 2, can define the one or more cells based on a hierarchy provided by the imported one or more tiles outlines. Alternatively or additionally, cell definition module 108, as part of computing device 202 in FIG. 2, can define, by the at least one processor in response to one or more user inputs, at least one of a position or orientation of the one or more chiplets. In such implementations, the one or more user inputs can correspond to one or more selections to perform at least one of flipping the one or more chiplets, rotating the one or more chiplets, and/or specifying an origin of the one or more chiplets. In some examples, cell definition module 108, as part of computing device 202 in FIG. 2, can attach a bump pattern to a master cell of a fixed component.

At step 308 one or more of the systems described herein can generate a package design. For example, package design generation module 110, as part of computing device 202 in FIG. 2, can generate, by the at least one processor and based at least in part on the defined boundary conditions and the defined one or more cells, a floorplan and bump placement for a package design.

The term "floorplan," as used herein, generally refers to a schematics representation of tentative placement of major functional blocks of an integrated circuit. For example, and without limitation, a floorplan can include bonding pads, line drivers, chip areas, area blocks for processor cores, etc. The floorplan can be bundled with bump patterns that can be defined as pseudobumps (e.g., circular graphical objects representing bumps), bitmaps, image data, 3D models of contoured bumps, etc.) In some examples, pseudobumps can be used for defining bump patterns and then converted into another suitable format in generating the floorplan and bump placement of the package design and/or thereafter.

The systems described herein can perform step 308 in a variety of ways. In some examples, package design generation module 110, as part of computing device 202 in FIG. 2, can generate the package design based on one or more fixed components. Alternatively or additionally, package design generation module 110, as part of computing device 202 in FIG. 2, can modify, by the at least one processor in response to one or more user inputs, one or more bump patterns of one or more of the defined one or more cells. In such implementations, the one or more user inputs can correspond to one or more selections to perform making an individual slave cell an independent cell, flipping the independent cell, rotating the independent cell, changing individual bumps of a bump pattern of the independent cell, or defining the independent cell as no fill. In some examples, package design generation module 110, as part of computing device 202 in FIG. 2, can form, by the at least one processor and in response to one or more user inputs, one or more groups of tiles, one or more structures, and/or one or more macros. In such implementations, the one or more structures can contain one or more predefined fixed components for physical implementation, one or more groups of tiles, and/or one or more individual tiles, and the one or more macros can contain one or more structures, one or more predefined fixed components for physical implementation, one or more groups of tiles, and/or one or more individual tiles. In such implementations, package design generation module 110, as part of computing device 202 in FIG. 2, can also perform at least one of repeating or modifying, by the at least one processor and in response to one or more user inputs, the one or more groups of tiles, the one or more structures, or the one or more macros. In such implementations, the one or more user inputs can correspond to one or more selections to perform making an individual group of tiles an independent group of tiles, defining a number of repetitions of the one or more groups of tiles, the one or more structures, or the one or more macros, defining a position of a repeated one or more groups of tiles, the one or more structures, or the one or more macros, and/or at least one of flipping or rotating at least one of an individual group of tiles, an individual structure, or an individual macro. In additional or alternative examples, package design generation module 110, as part of computing device 202 in FIG. 2, can provide a predefined bump pattern, by the at least one processor and based on the boundary conditions, in gaps of the floorplan that lie between individual cells, individual tiles, groups of tiles, structures, macros, and/or floorplan boundaries. In such implementations, package design generation module 110, as part of computing device 202 in FIG. 2, can provide the predefined bump pattern further based on one or more user inputs corresponding to one or more selections to perform aligning the predefined bump pattern within at least one of the gaps and/or changing (e.g., moving, resizing, deleting, etc.) individual bumps of the predefined bump pattern.

Figure 4:
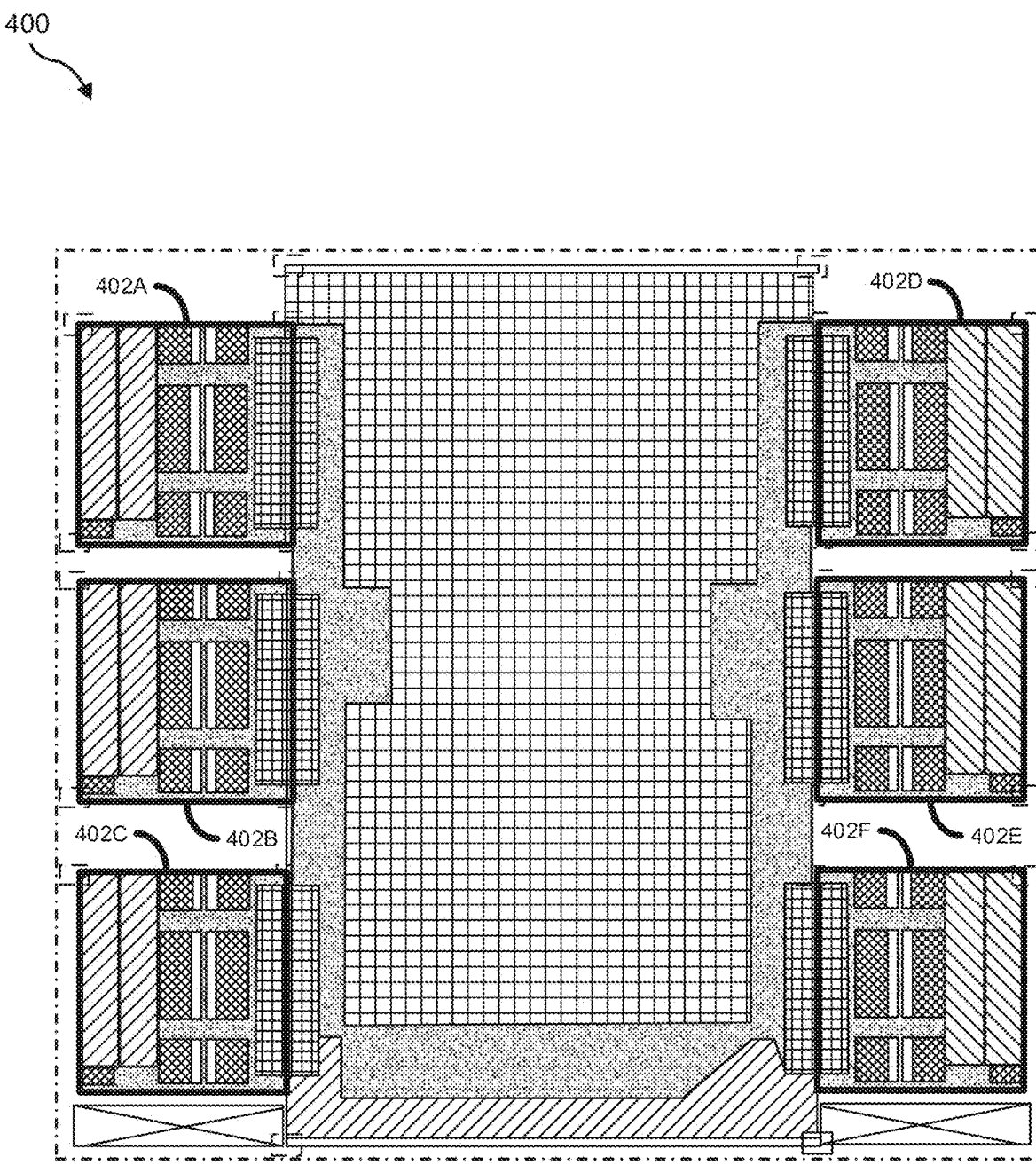
FIG. 4 is a graphical representation of a floorplan for a package design.
Figure 5:
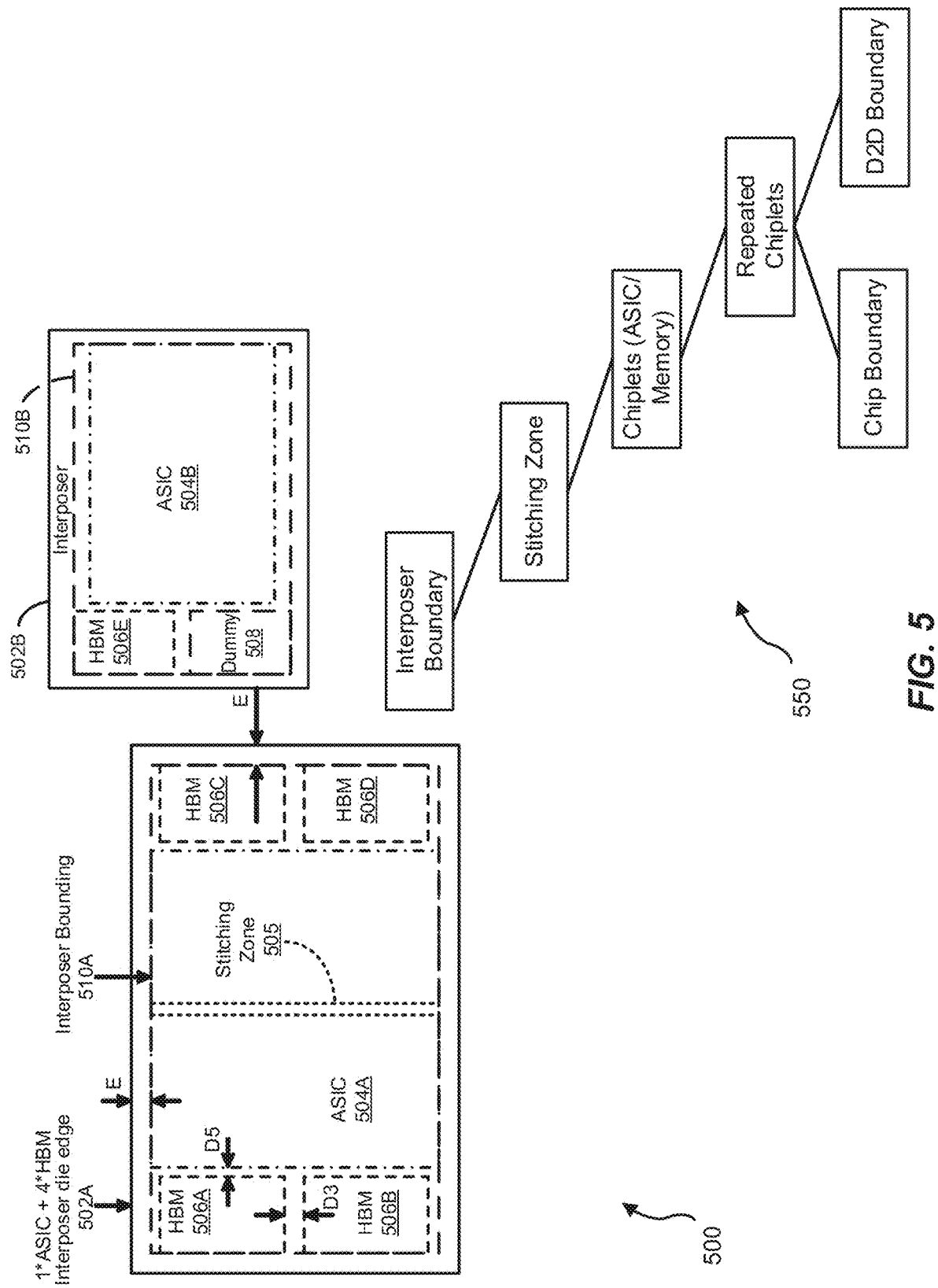
FIG. 5 is a block diagram illustrating floor plan boundaries.

FIG. 4 shows a floorplan 400 for a package design. Repeated chiplets 402A-402F are arranged on either side of the floorplan in a GUI that can indicate elements using display characteristics (e.g., color, pattern, shape, size, etc.). As shown in FIG. 5, floorplan boundaries 500 for repeated chiplets can be provided by imported layout files and/or user defined. Example floorplan boundaries 500 include one or more interposer top die boundaries 502A and 502B, application specific integrated circuit (ASIC) boundaries 504A and 504B, one or more stitching zones 505, high bandwidth memory (HBM) boundaries 506A-506E, dummy memory technology device (DMTD) boundaries 508, and/or interposer bounding boxes 510A and 510B.

Considering an interposer as an example, these floorplan boundaries can have a hierarchy 550 that can be provided by imported layout files, predefined by the system disclosed herein, and/or user defined. In some implementations, the hierarchy 550 can be predefined and the user can provide values for defining the boundaries according to a hierarchy 550 (e.g., drop down menu). Using hierarchy 550, a user can provide values for the interposer top die boundary, interposer bounding box (e.g., package boundary, fan out boundary, etc.), one or more stitching zones 505, keep out zone D3 and D5 for each chiplet, and a boundary offset E for each chiplet. In some implementations, the disclosed system and method can automatically place chiplets/tiles in the floorplan. In some implementations, values provided for some boundaries can impact choices for other boundaries according to the hierarchy (e.g., limit a range of definable values so as to prevent overlap of boundaries or violation of offsets and/or keep out zones). In some implementations, the GUI shown in FIG. 4 can have click and drag functionality with options to flip, rotate, copy, and/or paste the chiplets and/or chiplet elements subject to restrictions based on the boundary conditions (e.g., prevent overlap, enforce offsets and/or keep out zones). Gaps between boundaries can be filled with a predefined bump pattern that the user can modify (e.g., delete, reposition, copy, paste, etc. individual bumps and/or groups of bumps).

Figure 6:
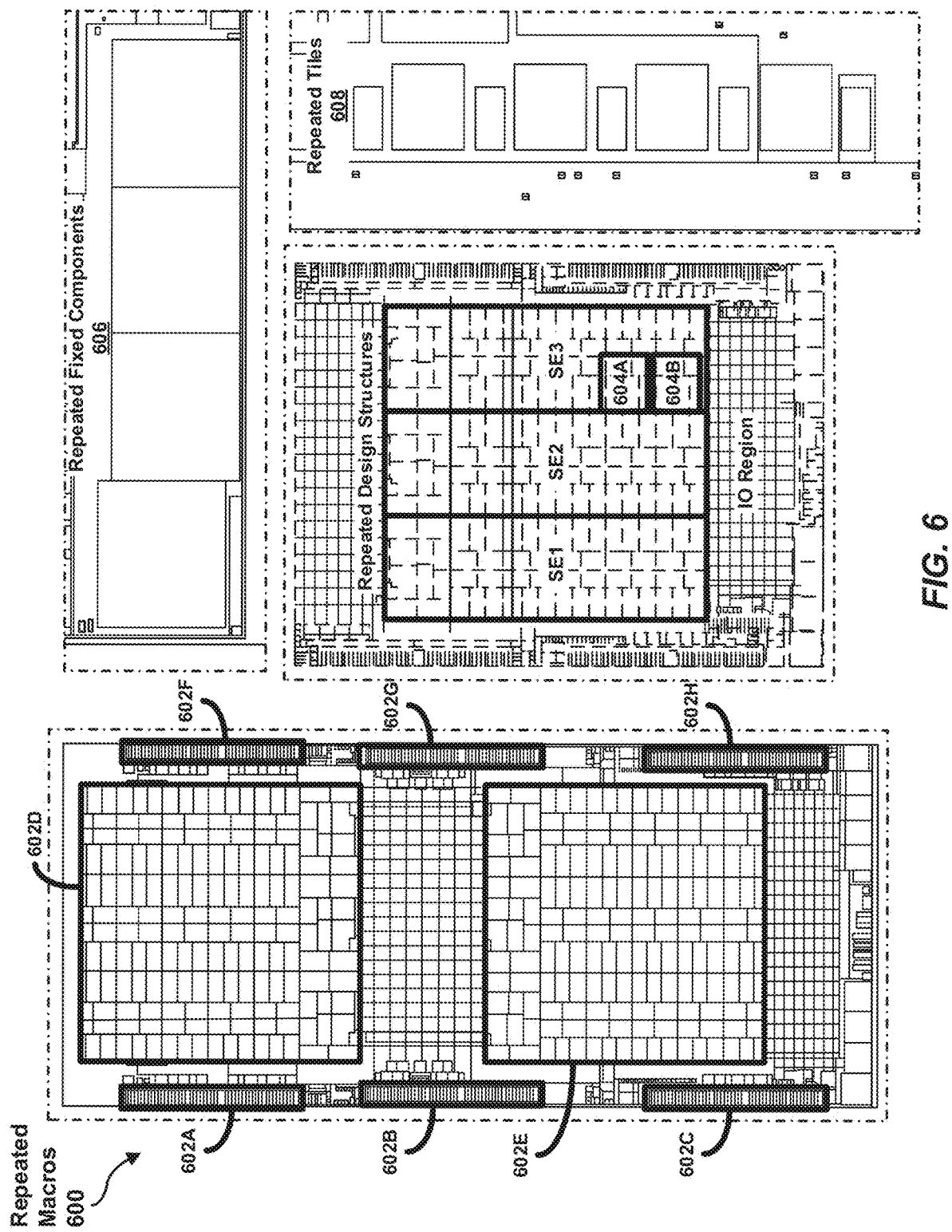
FIG. 6 is a graphical representation illustrating bump modeling based on macro tiles.
Figure 7:
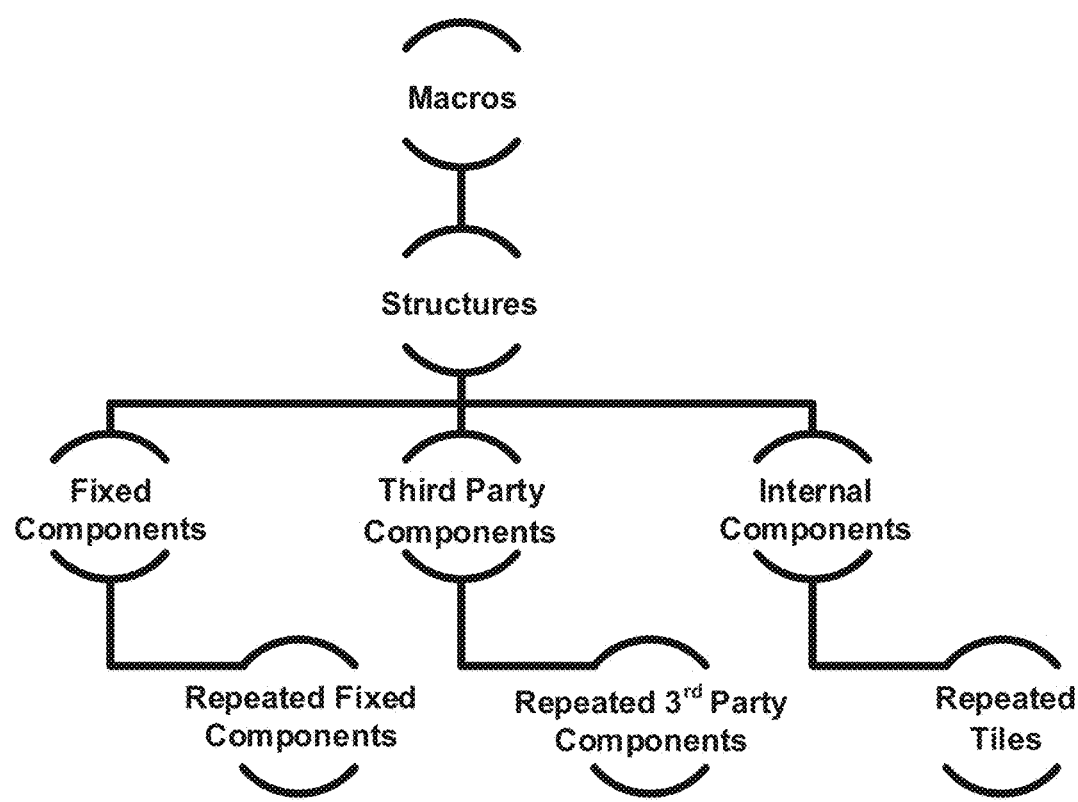
FIG. 7 is a block diagram illustrating a hierarchy of floorplan macros, structures, and tiles used for bump modeling.

FIG. 6 is a graphical representation illustrating bump modeling based on repeated macros 600, including macros 602A-602G. These macros 602A-602G can include repeated structures SE1-SE3, which can include groups 604A and 604B of tiles and/or individual tiles. Groups 604A and 604B of tiles can be user defined (e.g., by selecting multiple adjacent internal tiles and choosing to group them), or defined by an imported layout (e.g., for a fixed component (internal fixed components, $3^{rd}$ party (i.e., vendor) fixed components, etc.), and the fixed components can be repeated to form repeated fixed components 606. In some implementations, repeated structures SE1-SE3 can also include individual tiles, and/or macros can also include groups of tiles and/or individual tiles. A structure can include individual tiles that can be repeated to form repeated tiles 608 within the structure. FIG. 7 demonstrates this hierarchy 700 of floorplan macros, structures, and tiles used for bump modeling.

Figure 8:
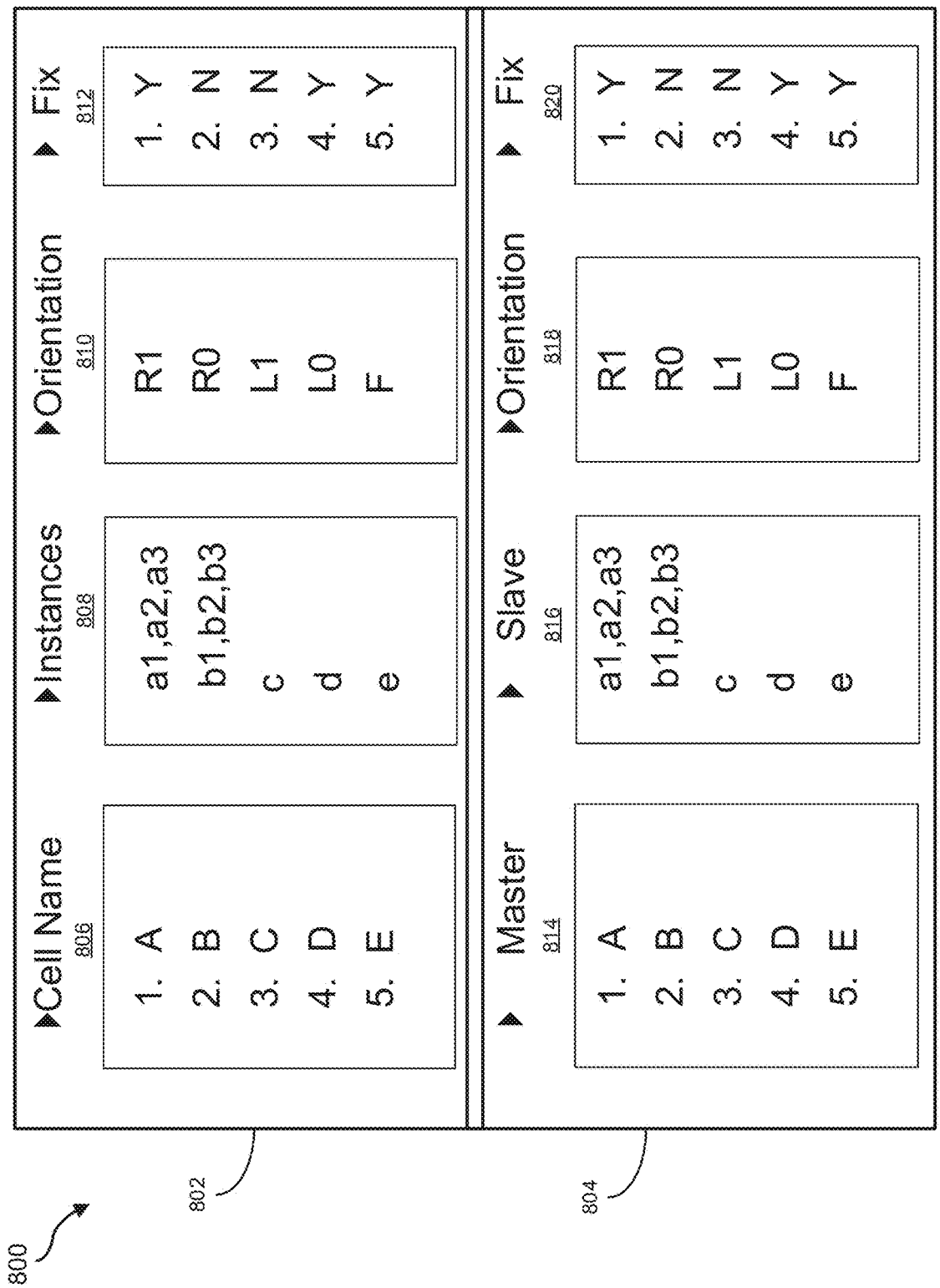
FIG. 8 is a block diagram illustrating an example graphical user interface used for bump modeling.

FIG. 8 illustrates an example GUI 800 used for bump modeling and can be arranged to obtain information in a hierarchical manner that provides information for generating all or a portion of a floorplan and bump placement for a package design. GUI 800 can include a tiles/cells interface element 802 and a bumps interface element 804. Tiles/cells interface element 802 and bumps interface element 804 can be provided as separate windows, separate screens, and/or different display regions of GUI 800. Tiles/cells interface element 802 can have cell name controls 806, instances controls 808, orientation controls 810, and/or fix controls 812. Bumps interface element 804 can have master name controls 814, slave controls 816, orientation controls 818, and/or fix controls 820. The controls of tiles/cells interface element 802 and bumps interface element 804 can be used to define characteristics of tiles/cells and bump patterns, respectively.

The controls of tiles/cells interface element 802 can be used in various ways. For example, cell name controls 806 can be used to import one or more tile layout files, and names A-E of cells defined in the one or more imported files can be set based on data in the one or more imported files and/or defined by a user entering and/or editing cell names by interacting with cell name controls 806 (e.g., text edit by right click). In some implementations, cell name controls 806 can be used to define and/or modify cell hierarchy by, for example, reassigning a slave cell as the master cell (e.g., dragging and dropping the slave cell to the cell names controls 806). Additionally, instances controls 808 can provide labeled cell instances a1-a3, b1-b3, c, d, and e. Instances such as a1-a3 and b1-b3 can indicate repeated instances of corresponding cells, and these repeated instances can be defined by the one or more imported files and/or user defined. For example, some implementations of GUI 800 can provide options for repeating the cells. Also, orientation controls 810 can be used to define an orientation (e.g., rotation R1, R0, L1, L0, and/or a flip F (e.g., on an x axis or y axis) of a cell (e.g., can be tagged to slave cell). Further, fix controls 812 can be used to define Y, N whether a cell is a fixed component, as opposed to part of an internal tiles (e.g., soft tiles), and this definition can be tagged to the cell name. Together, the controls of tiles/cells interface element 802 can obtain information sufficient for automatic generation of a tile layout (e.g., for a macro, structure, group of tiles, individual tiles, and/or entire layout) for the floorplan and/or provide sufficient information to use as a starting point. For example, some implementations can use the obtained information to provide tile layout objects meeting requirements specified by the information and allow the user to further define the layout (e.g., using drag and drop functionality, subject to boundary conditions, in a graphical representation of the floorplan).

The controls of bumps interface element 804 can also be used in various ways. For example, master name controls 814 can display the master cell names and can be used to attach a bump pattern to a master cell, causing this bump pattern to be applied automatically to the slave cells. Additionally, slave controls 816 can display structures corresponding to the cell instances and allow the user to modify the cell instances (e.g., make a cell instance independent by reassigning it as a master by dragging and dropping it into the master name controls 814, make an independent cell no fill, attach a different bump pattern to an independent cell instance, manually modify individual bumps or groups of bumps of an independent cell instance, etc.). Also, orientation controls 818 can display the orientation of the bump patterns bounded by the cells and allow a user to modify bump pattern orientation to match that of the cells. In some implementations, a user can select an independent cell instance in slave controls 816 and change the orientation of the bump pattern of the independent cell instance without affecting orientation of the bump pattern for the other cell instances for that cell. In some implementations, the user can select a structure in slave controls 816 and/or a macro in master name controls 814 and change the bump pattern orientation for an entire structure and/or entire macro. Further, fix controls 820 can display the fixed component status of a cell or cell instances and prevent and/or allow modification (certain types of modifications and/or any modifications, etc.) thereof (e.g., Y can prevent cell independence and N can allow cell independence). Together with obtained boundary conditions and information obtained by tiles/cells interface element 802, information obtained by bumps interface element 804 can provide a floorplan and bump pattern design for an IC package that both automates the floorplan creation and addresses the bump grouping specific to the floorplan.

In an example, the disclosed systems and methods can provide a floor plan and bump pattern generation process that includes design rule checks at every automation step (e.g., by displaying results in the GUI of FIG. 4). In an initial step, a user can define boundary conditions for floorplan regions, such as a die boundary, a fan out boundary, one or more stitching zones, a keep out zone for each chiplet, and/or a boundary offset for each chiplet. In some implementations, a user can provide these definitions in a drop-down menu and/or resulting boundaries can be displayed in a graphical representation of the floorplan. Next, a user can import one or more tiles outlines, which can be provided in a text format and specify position and orientation for each chiplet. The disclosed systems and methods can internally map the master and slave cells from the imported layout files with respect to each chiplet. A display of the slave cells can use the same color to aid in visually confirming that the mapping has been performed correctly (e.g., in the GUI of FIG. 4). The user can also define whether a master cell is an internal fixed component or $3^{rd}$ party fixed component by making it a fixed component, thus preventing declaration of independence to its cells.

Following the importation of the tile layout files, the user can import one or more fixed components (e.g., hard IP GDS files). an imported GD can be mapped to a bump pattern, and the user can attach the bump pattern to a master cell. Slave cells are next automatically filled with the same bump pattern as the master cell, and a user can define a slave cell as no fill (e.g., before and/or after automatic filling of the slave cells). The user also can define a hierarchy of the cells (e.g., by dragging and dropping a slave cell into a master cell position of the GUI of FIG. 8). The user can also define orientation (e.g., flip, rotate, etc.) of slave cell bounded bump patterns.

Next, the user can enable modification (e.g., flip, rotate, etc.) of structures and/or macros and change orientation of the structures and/or macros. The user can also group tiles and make the group tiles independent without changing the cell hierarchy. Finally, the user can fill gaps between boundaries using a bump fill pattern based on start/end boundaries and a fill direction with imposed constraints (e.g., minimum keep out zones from macros, structures, fixed components, and/or cells, and/or user selection regarding bump pattern fill alignment (left, right, center, other, etc.)). The user can also manually modify individual bumps or groups of bumps in the resulting fill pattern.

As set forth above, the disclosed systems and methods provide hierarchical-based floorplan and bumps modeling for package design which can be implemented in various package design and 3DIC integration tools. The automation method is focused on various algorithms and implementation steps to enable the hierarchical-based floorplan and bumps modeling for package design. Also disclosed is a graphical user interface that includes all necessary user inputs required for this automation.

An example method can begin with defining boundary conditions like die boundary, package boundary, stitching zones, and keep-out zones for each chiplet along with offset conditions. The example method can also include importing various LEF/DEF tiles outlines based on the different tool requirements and formatting. A user interface enables user selections for orientation (e.g., flip, rotate, etc.) and origin for each chiplet, and applied constraints ensure that a silicon die edge matches with imported chiplet outlines. A hierarchical method is disclosed for definition of each master and slave cell with respect to each chiplet. Automation for bump creation and grouping of bump patterns with each master cell enables autofill of slave cells with the same bump pattern from the master cell.

The disclosed systems and methods can achieve various advantageous results. For example, the disclosed systems and methods can automatically create a floorplan based on chip and package boundaries and can automatically create bump patterns that are bundled with the floorplan. Additionally, the disclosed systems and methods can reutilize the design and/or portions thereof through compartmentalization. Also, the disclosed systems and methods can provide a GUI that obtains user input while clearly defining the necessary steps to be followed. Further, the disclosed systems and methods can consider the design for manufacturing and design rule checks at every automation step. In this way, the disclosed systems and methods can achieve solid automation for floorplan creation and design feasibility studies while reducing efforts by senior engineers (e.g., by more than 100 hours).

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method, comprising:
defining, by at least one processor, one or more boundary conditions;
importing, by the at least one processor, one or more tiles outlines that at least define a cell hierarchy for one or more chiplets;
defining, by the at least one processor and based at least in part on the one or more tiles outlines, one or more cells of the one or more chiplets at least in part by automatically filling one or more slave cells of the one or more chiplets with a same bump pattern as a master cell of the one or more chiplets; and
generating, by the at least one processor and based at least in part on the defined boundary conditions and the defined one or more cells, a floorplan and bump placement for a package design.

2. The method of claim 1, wherein the one or more boundary conditions include at least one of:
a die boundary;
a package boundary;
one or more keep-out zones for the one or more chiplets; or
one or more boundary offsets for the one or more chiplets.

3. The method of claim 1, wherein defining the one or more cells is further based on a hierarchy provided by the imported one or more tiles outlines.

4. The method of claim 1, further comprising:
defining, by the at least one processor in response to one or more user inputs, at least one of a position or orientation of the one or more chiplets.

5. The method of claim 4, wherein the one or more user inputs correspond to one or more selections to perform at least one of:
- flipping the one or more chiplets;
- rotating the one or more chiplets; or
- specifying an origin of the one or more chiplets.

6. The method of claim 1, further comprising:
- importing one or more files at least defining one or more fixed components for physical implementation; and
- attaching a bump pattern to a master cell of a fixed component,
- wherein generating the floorplan is further based on the one or more fixed components.

7. The method of claim 1, further comprising:
- modifying, by the at least one processor in response to one or more user inputs, one or more bump patterns of one or more of the defined one or more cells.

8. The method of claim 7, wherein the one or more user inputs correspond to one or more selections to perform at least one of:
- making an individual slave cell an independent cell;
- flipping the independent cell;
- rotating the independent cell;
- changing individual bumps of a bump pattern of the independent cell; or
- defining the independent cell as no fill.

9. The method of claim 1, further comprising:
- forming, by the at least one processor and in response to one or more user inputs, at least one of:
  - one or more groups of tiles;
  - one or more structures containing at least one of:
    - one or more predefined fixed components for physical implementation;
    - one or more groups of tiles; or
    - one or more individual tiles; or
  - one or more macros containing at least one of:
    - one or more structures;
    - one or more predefined fixed components for physical implementation;
    - one or more groups of tiles; or
    - one or more individual tiles; and
- performing at least one of repeating or modifying, by the at least one processor and in response to one or more user inputs, the one or more groups of tiles, the one or more structures, or the one or more macros.

10. The method of claim 9, wherein the one or more user inputs correspond to one or more selections to perform at least one of:
- making an individual group of tiles an independent group of tiles;
- defining a number of repetitions of the one or more groups of tiles, the one or more structures, or the one or more macros;
- defining a position of a repeated one or more groups of tiles, the one or more structures, or the one or more macros; or
- at least one of flipping or rotating at least one of an individual group of tiles, an individual structure, or an individual macro.

11. The method of claim 1, further comprising:
- providing a predefined bump pattern, by the at least one processor and based on the boundary conditions, in gaps of the floorplan that lie between at least one of:
  - individual cells;
  - individual tiles;
  - groups of tiles;
  - structures;
  - macros; or
  - floorplan boundaries.

12. The method of claim 11, wherein providing the predefined bump pattern is further based on one or more user inputs corresponding to one or more selections to perform at least one of:
- aligning the predefined bump pattern within at least one of the gaps; or
- changing individual bumps of the predefined bump pattern.

13. A system, comprising:
- at least one physical processor;
- physical memory comprising computer-executable instructions that, when executed by the physical processor, cause the physical processor to:
  - define one or more boundary conditions;
  - import one or more tiles outlines that at least define a cell hierarchy for one or more chiplets;
  - define, based at least in part on the one or more tiles outlines, one or more cells of the one or more chiplets at least in part by automatically filling one or more slave cells of the one or more chiplets with a same bump pattern as a master cell of the one or more chiplets; and
  - generate, based at least in part on the defined boundary conditions and the defined one or more cells, a floorplan and bump placement for a package design.

14. The system of claim 13, wherein the one or more boundary conditions include at least one of:
- a die boundary;
- a package boundary;
- one or more keep-out zones for the one or more chiplets; or
- one or more boundary offsets for the one or more chiplets.

15. The system of claim 13, wherein the instructions cause the at least one processor to define the one or more cells further based on a hierarchy provided by the imported one or more tiles outlines.

16. The system of claim 13, wherein the instructions further cause the at least one processor to:
- define, in response to one or more user inputs, at least one of a position or orientation of the one or more chiplets.

17. The system of claim 13, wherein the instructions further cause the at least one processor to:
- import one or more predefined files at least defining one or more fixed components for physical implementation; and
- attach a bump pattern to a master cell of a fixed component,
- wherein generating the floorplan and bump placement of the package design is further based on the one or more predefined files.

18. The system of claim 13, wherein the instructions further cause the at least one processor to:
- modify, in response to one or more user inputs, one or more bump patterns of one or more of the defined one or more cells.

19. The system of claim 13, wherein the instructions further cause the at least one processor to:
- provide a predefined bump pattern, based on the boundary conditions, in gaps of the floorplan that lie between at least one of:
  - individual cells;
  - individual tiles;
  - groups of tiles;
  - structures;
  - macros; or
  - floorplan boundaries.

20. A non-transitory computer-readable medium comprising one or more computer-executable instructions that, when executed by at least one processor of a computing device, cause the computing device to:
- define one or more boundary conditions;
- import one or more tiles outlines that at least define a cell hierarchy for one or more chiplets;
- define, based at least in part on the one or more tiles outlines, one or more cells of the one or more chiplets at least in part by automatically filling one or more slave cells of the one or more chiplets with a same bump pattern as a master cell of the one or more chiplets; and
- generate, based at least in part on the defined boundary conditions and the defined cells, a floorplan and bump placement for a package design.

* * * * *